July 14, 1925.
C. L. JOHNSON
1,545,660
SPARE TIRE LOCKING DEVICE
Filed July 12, 1923
2 Sheets-Sheet 1
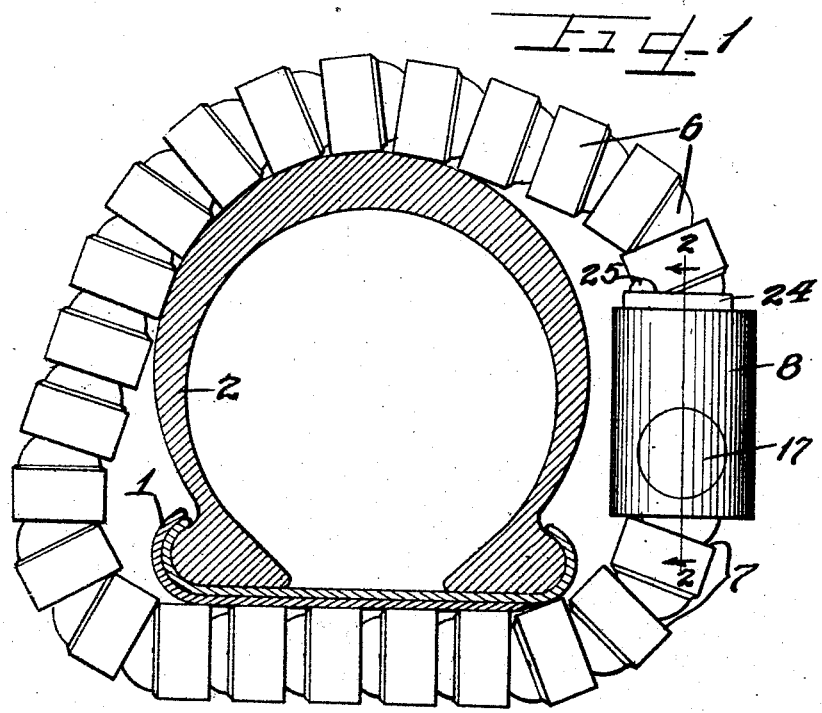
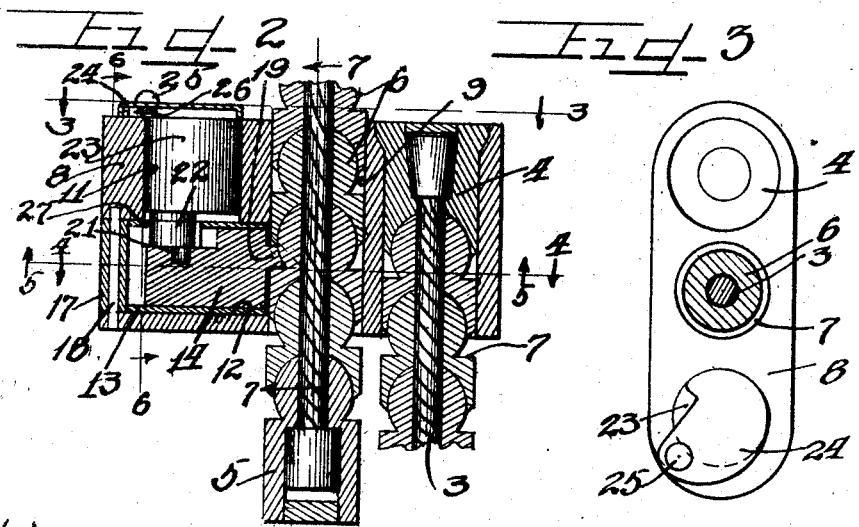
Witnesses
Inventor
Colvin L. Johnson July 14, 1925.
C. L. JOHNSON
1,545,660
SPARE TIRE LOCKING DEVICE
Filed July 12, 1923
2 Sheets-Sheet 2
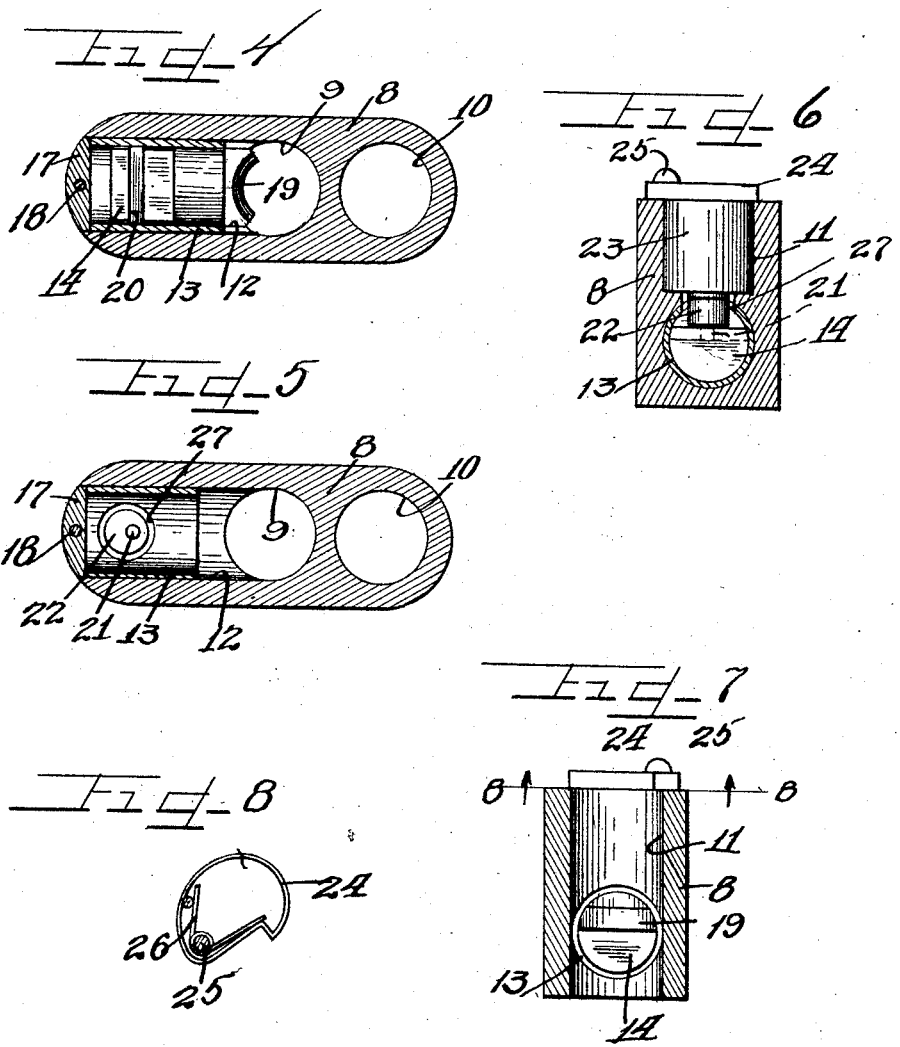

Patented July 14, 1925.

1,545,660

UNITED STATES PATENT OFFICE.

COLVIN L. JOHNSON, OF ST. LOUIS, MISSOURI, ASSIGNOR TO JOHNSON AUTOMOBILE LOCK CO., A CORPORATION OF ILLINOIS.

SPARE-TIRE-LOCKING DEVICE.

Application filed July 12, 1923. Serial No. 651,011.

*To all whom it may concern:*

Be it known that I, COLVIN L. JOHNSON, a citizen of the United States, and a resident of the city of St. Louis, State of Missouri, have invented certain new and useful Improvements in a Spare-Tire-Locking Device; and I do hereby declare that the following is a full, clear, and exact description of the same, reference being had to the accompanying drawings and to the numerals of reference marked thereon, which form a part of this specification.

This invention relates to an improved type of spare tire locking device, in which the cost of manufacture is materially reduced and wherein the manufacture and assembly is simplified.

It is an object of this invention to provide an improved method of manufacturing and assembling spare tire locking blocks.

It is also an object of this invention to provide an improved spare tire or wheel lock wherein the latch bolt is slidable in a guide sleeve positioned within a closed bore of a lock block for co-action with an armored cable, said bore being positioned at right angles and in the plane of three parallel drillings made longitudinally in the lock block.

It is an important object of this invention to provide a spare tire lock block which may be readily drilled to permit the locking members and an armored cable to be quickly mounted in position to provide a spare tire lock.

Other and further important objects of this invention will be apparent from the disclosures in the specification and accompanying drawings.

This invention (in a preferred form) is illustrated in the drawings and hereinafter more fully described.

On the drawings:

Figure 1 is a transverse section of a tire and rack equipped with a spare tire lock having an improved locking block embodying the principles of this invention.

Figure 2 is a fragmentary section taken on line 2—2 of Figure 1 showing parts in elevation.

Figure 3 is a view taken on line 3—3 of Figure 2.

Figure 4 is a detail section taken on line 4—4 of Figure 2 with the armored cable omitted.

Figure 5 is a detail section on line 5—5 of Figure 2 with the cable omitted.

Figure 6 is a transverse section of the locking block taken on line 6—6 of Figure 2.

Figure 7 is a transverse detail section taken on line 7—7 of Figure 2.

Figure 8 is a detail view of the key lock protecting cover taken on line 8—8 of Figure 7.

As shown on the drawings:

The reference numeral 1 indicates a tire support having mounted thereon a spare tire 2 which is locked in place by a tire lock of this invention. The tire lock comprises an armored cable formed of a stranded cable or rope 3, preferably of steel or other flexible wire, having terminals 4 and 5 attached to the ends thereof. Intermediate the terminals 4 and 5 are arranged a series of interfitting armor members 6 having shoulders 7 formed thereon.

The armored cable is used in connection with a metal block 8 made of high grade steel and having rounded ends and flat top and bottom surfaces. The block 8 is drilled to provide a pair of parallel cable openings 9 and 10 and with a lock chamber or recess 11 which is also parallel to the openings 9 and 10. The openings 9 and 10 extend through the block while the opening 11 extends about half way through the block and communicates with a bore or opening 12 drilled in the block in the plane of the openings 9, 10 and 11, but at right angles thereto. The inner end of the opening 12 opens into the opening 9. The block 8 is thus provided with four openings or drillings which may be conveniently drilled in the block at a small expense.

Secured in the opening 12 is a guide sleeve 13 of suitable contact metal within which a latch bolt 14 is positioned to slide. A circular plug or closure plate 17 which is shaped to conform to the shape of the curved end of the block 8 is secured in the outer end of the opening 12. The closure plate 17 is retained in place by means of a pin 18 to seal the outer end of the opening 12. The end of the pin 18 is ground off flush with the bottom surface of the block 8.

The latch bolt 14, when in locking position, has the locking tip 19 thereof projecting into the block opening 9 and engaging in the notched portion of one of the armor members 6 adjacent the shoulder 7, to hold the armored cable locked against retraction from the block 8.

The latch bolt 14 is provided with a transverse slot or groove 20 (Figure 4) into which projects a pin 21 which is secured eccentrically on the inner end of a rotatable lock barrel 22. The barrel 22 forms part of a key lock 23 which is mounted in the block opening 11. The lock barrel 22 is provided with a key slot which is normally closed by means of a closure cap 24 pivoted upon the top surface of the block 8 by means of a pin 25. A spring 26 is mounted within the cap 24 to normally hold the cap 24 in a closed position to cover the lock key slot and so protect the same from dirt and the like. As shown in Figure 2, the sleeve 13 is provided with an opening 27 through which the lock barrel 22 projects.

When the armored cable is looped around a spare tire or other article on the tire support 1, the end 5 of the cable is pulled through the block opening 9 until the enlarged end of the terminal head 4 seats in the reamed out end of the block opening 10. During the pulling of the armored cable through the block openings, the latch bolt 14 is forced into retracted position with the passing of the cable links. The latch bolt may be retracted by means of a key to permit withdrawal of the cable through the block opening 9. The sleeve 13 in the block 8 affords a suitable guide for the latch bolt and may be made of babbitt or other suitable bearing material.

The method of manufacturing the spare tire lock is simple and inexpensive, and the parts are adapted to be readily assembled. The block is first drilled and reamed to provide the openings 9 and 10, after which the opening 12 is drilled in the block, to communicate with the opening 9. The recess 11 is next drilled in the block to communicate with the opening 12. When the block is drilled the sleeve 13 and the latch bolt 14 are placed within the block opening 12. The closure plate 17 is rigidly secured in place by means of the pin 18. The key lock 23 and the armored cable are then mounted in place to provide the finished lock.

I am aware that numerous details of construction may be varied through a wide range without departing from the principles of this invention, and I therefore do not purpose limiting the patent granted otherwise than necessitated by the prior art.

I claim as my invention:

1. A spare tire lock comprising a block having three parallel openings therein and a recess connecting two of said openings, a guide sleeve secured in said recess, a latch bolt slidable in said sleeve, a plate for closing one end of said recess, means for securing the plate in place, an armored cable engaged through two of said openings and adapted to be locked by said latch bolt, a key operated pin lock in the other of said openings positioned to co-act with the latch bolt to permit operation thereof, and a spring controlled cover mounted on said block for covering the exposed end of the key lock.

2. A lock of the class described comprising an armored cable and a latch mechanism, a block supporting the same having openings drilled therein, two of which are connected by a recess drilled in said block at right angles to said openings and connecting two of the openings, said recess having the latch mechanism disposed therein, a plate in said recess flush with the outer surface of the block, and a pin projecting through the plate and projecting into openings in said block to rigidly hold the plate secured in said recess to close the same.

3. A spare tire lock of the class described comprising a block having a plurality of drillings therein, an armored cable engaged through two of said drillings, an apertured sleeve in another of said drillings, a latch bolt in said sleeve, means for sealing up the outer end of the drilling in which said sleeve is disposed, and a key lock in still another of said drillings projecting through the apertured sleeve to engage the latch bolt to permit operation thereof into and out of engagement with the armored cable.

In testimony whereof I have hereunto subscribed my name in the presence of two subscribing witnesses.

COLVIN L. JOHNSON.

Witnesses:
CHARLES W. HILLS, Jr.
FRED E. PAESLER.